United States Patent
Sato et al.

(10) Patent No.: US 10,581,055 B2
(45) Date of Patent: Mar. 3, 2020

(54) BUSBAR MODULE AND BATTERY PACK

(71) Applicant: Yazaki Corporation, Tokyo (JP)

(72) Inventors: Katsunori Sato, Shizuoka (JP); Yutaro Okazaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/380,626

(22) Filed: Dec. 15, 2016

(65) Prior Publication Data

US 2017/0179458 A1 Jun. 22, 2017

(30) Foreign Application Priority Data

Dec. 18, 2015 (JP) .................................. 2015-248006

(51) Int. Cl.
*H01M 2/20* (2006.01)
*H01M 2/10* (2006.01)

(52) U.S. Cl.
CPC ......... *H01M 2/206* (2013.01); *H01M 2/1077* (2013.01); *H01M 2220/20* (2013.01)

(58) Field of Classification Search
None
See application file for complete search history.

(56) References Cited

U.S. PATENT DOCUMENTS

| 6,045,938 | A | * | 4/2000 | Winsel | ................. | G01N 27/302 |
| | | | | | | 204/265 |
| 9,024,572 | B2 | | 5/2015 | Nishihara et al. | | |
| 9,666,840 | B2 | | 5/2017 | Sakai et al. | | |
| 2012/0019061 | A1 | | 1/2012 | Nishihara et al. | | |
| 2012/0328920 | A1 | * | 12/2012 | Takase | ................. | H01M 2/1077 |
| | | | | | | 429/90 |
| 2016/0035497 | A1 | * | 2/2016 | Sengoku | ................. | H01G 11/10 |
| | | | | | | 429/90 |
| 2017/0033332 | A1 | * | 2/2017 | Sakai | ...................... | H01M 2/10 |

FOREIGN PATENT DOCUMENTS

| JP | 2011-210710 A | | 10/2011 | | |
| JP | WO 2015/0162996 | * | 10/2015 | ............. | H01M 2/10 |
| JP | 2015-207442 A | | 11/2015 | | |
| WO | 2010/113455 A1 | | 10/2010 | | |
| WO | 2011/111676 A1 | | 9/2011 | | |

OTHER PUBLICATIONS

Nishihara et al. (WO 2010/0113455) (a raw machine translation) (Abstract) (Year: 2010).*
Nishihara et al. (WO 2010/0113455) (a raw machine translation) (Detailed Description) (Year: 2010).*
Japanese Office Action for the related Japanese Patent Application No. 2015-248006 dated Dec. 26, 2017.

* cited by examiner

*Primary Examiner* — Carmen V Lyles-Irving
(74) *Attorney, Agent, or Firm* — Kenealy Vaidya LLP

(57) ABSTRACT

A busbar module and a battery pack include busbars each having connection portions protruding toward electrode terminals relative to a base portion located between the connection portions. In the busbar module, for example, the connection portions each share a boundary with the base portion. The boundary extends in a direction orthogonal to a direction in which the busbars are aligned. The connection portions have a shape in which both edges of the busbars in the alignment direction of the busbars are bent toward the electrode terminals with the boundary is used as a bending origin.

3 Claims, 14 Drawing Sheets

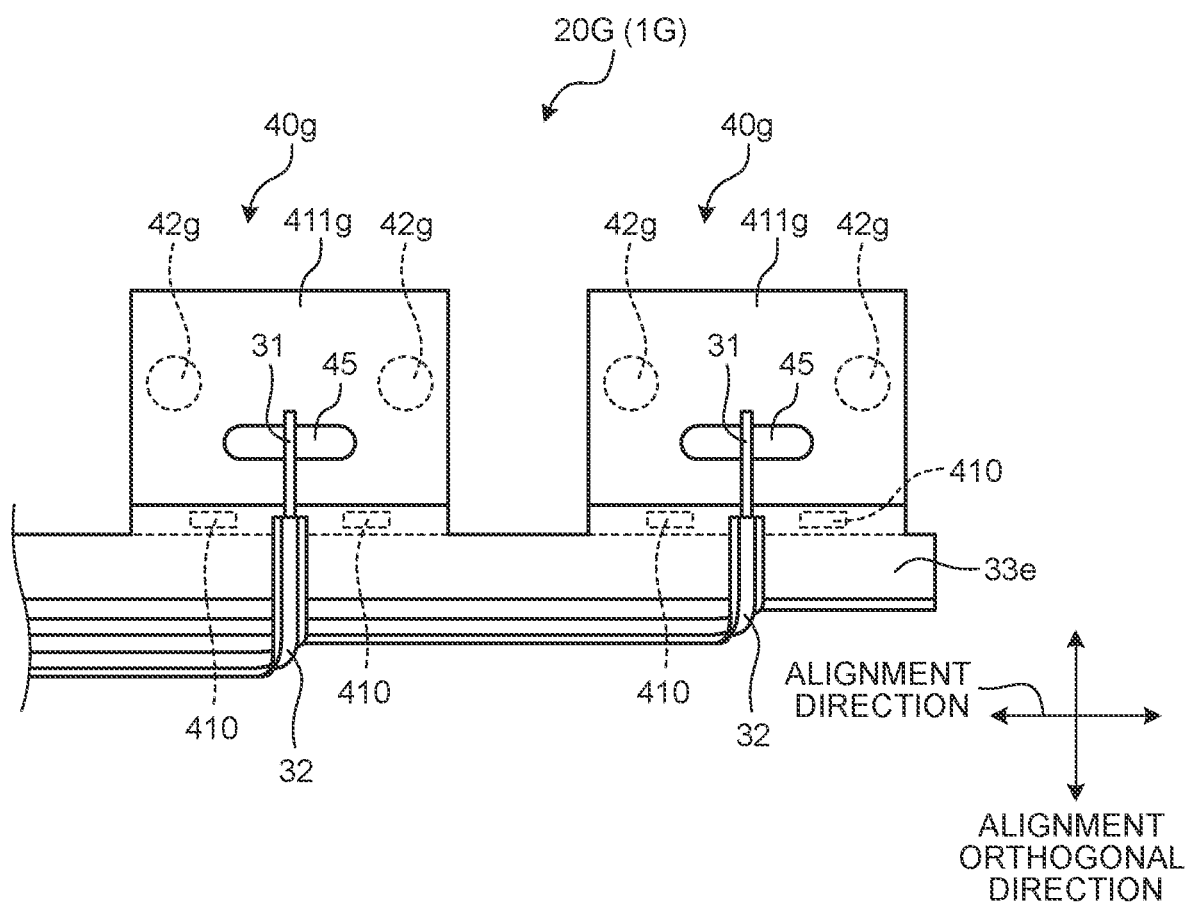

BUSBAR MODULE AND BATTERY PACK

CROSS-REFERENCE TO RELATED APPLICATION(S)

The present application claims priority to and incorporates by reference the entire contents of Japanese Patent Application No. 2015-248006 filed in Japan on Dec. 18, 2015.

BACKGROUND OF THE INVENTION

1. Field of the Invention

The present invention relates to a busbar module and a battery pack.

2. Description of the Related Art

Conventional electric and hybrid vehicles include a battery module configured of many battery cells arranged side by side and connected in series or parallel in view of the output power and the driving range, for example. The battery cells of the battery module are arranged side by side so that one of two electrode terminals of each cell is linearly aligned with one another and the other electrode terminal of each cell is linearly aligned with one another. The battery module is housed in a housing with the cells housed in chambers in the housing. The battery module constitutes a battery pack together with other components such as a busbar module. The busbar module is provided, for example, for each set of electrode terminals that are linearly aligned. The busbar module includes at least a plurality of busbars each electrically connecting electrode terminals of the battery cells adjacent to each other and a plurality of linear conductors that are provided for the busbars one by one and are electrically connected to the busbars (refer to, for example, Japanese Patent Application Laid-open No. 2011-210710). Such busbars, for example, each have a planar shape and include connection portions located at both ends thereof in a direction in which the busbars are aligned. The connection portions are, for example, welded to the corresponding electrode terminals.

When the electrode terminals are at different height positions in the height direction of the battery cells, it takes much time for factory workers to weld the connection portions of the busbars to the electrode terminals because the busbars have a planar shape.

SUMMARY OF THE INVENTION

The present invention has been made in view of the foregoing, and it is an object of the present invention to provide a busbar module and a battery pack that allow connection portions of a busbar to be easily and directly joined with electrode terminals.

In order to solve the above mentioned problems and achieve the above mentioned object, a busbar module according to one aspect of the present invention includes a busbar connected to electrode terminals of an electrode terminal group in a battery module composed of a plurality of battery cells, the electrode terminals being linearly aligned; and a flat cable including a linear conductor connected to the busbar, a cover that covers the linear conductor, and a busbar holder that holds the busbar, wherein a plurality of busbars are aligned in a direction in which the electrode terminals are aligned, each of the busbars includes two connection portions connected to the electrode terminals of the battery cells, the electrode terminals being adjacent to each other, and a base portion located between the two connection portions, and at least one of the connection portions protrudes toward the electrode terminals relative to the base portion.

According to another aspect of the present invention, in the busbar module, it is preferable that the two connection portions are held by the busbar holder through the base portion, each of the connection portions shares a boundary with the base portion, the boundary extending in an alignment crossing direction that crosses a direction in which the busbars are aligned, and the connection portions have a shape in which both edges of the busbars in the alignment direction of the busbars are bent toward the electrode terminals with the boundary is used as a bending origin.

According to still another aspect of the present invention, in the busbar module, it is preferable that an end of the linear conductor is connected to the base portion.

A battery pack according to still another aspect of the present invention includes a battery module composed of a plurality of battery cells; and a busbar module that electrically connects the battery cells, wherein the busbar module includes a busbar connected to electrode terminals of an electrode terminal group in the battery module, the electrode terminals being linearly aligned, and a flat cable including a linear conductor connected to the busbar, a cover that covers the linear conductor, and a busbar holder that holds the busbar, a plurality of busbars are aligned in a direction in which the electrode terminals are aligned, each of the busbars includes two connection portions connected to the electrode terminals of the battery cells, the electrode terminals being adjacent to each other, and a base portion located between the two connection portions, and at least one of the connection portions protrudes toward the electrode terminals relative to the base portion.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 19 is a plan view illustrating another example of the configuration of a part of the busbar module according to the sixth modification.

DETAILED DESCRIPTION OF THE PREFERRED EMBODIMENTS

An embodiment of the present invention will be described in detail with reference to the accompanying drawings. The content described in the following embodiment is not intended to limit the scope of the present invention. Components described below include components that can be easily thought of by the skilled person or components that are substantially the same. Configurations described below can be combined as appropriate. Moreover, omissions, substitutions, or alterations of the configurations may be performed without departing from the gist of the present invention.

Embodiment

Figure 1:
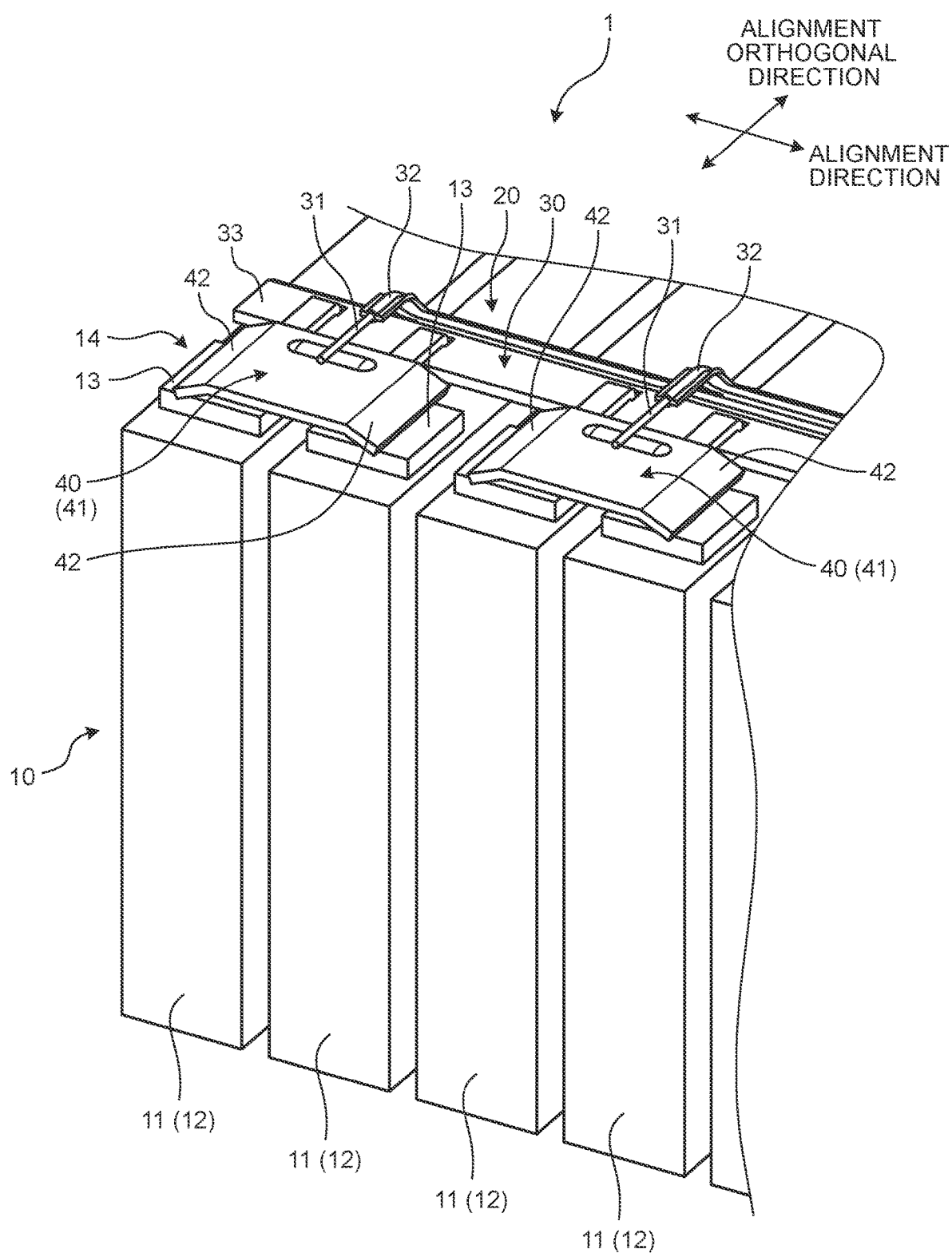
FIG. 1 is a perspective view illustrating an example of a configuration of a part of a battery pack according to an embodiment.
Figure 2:
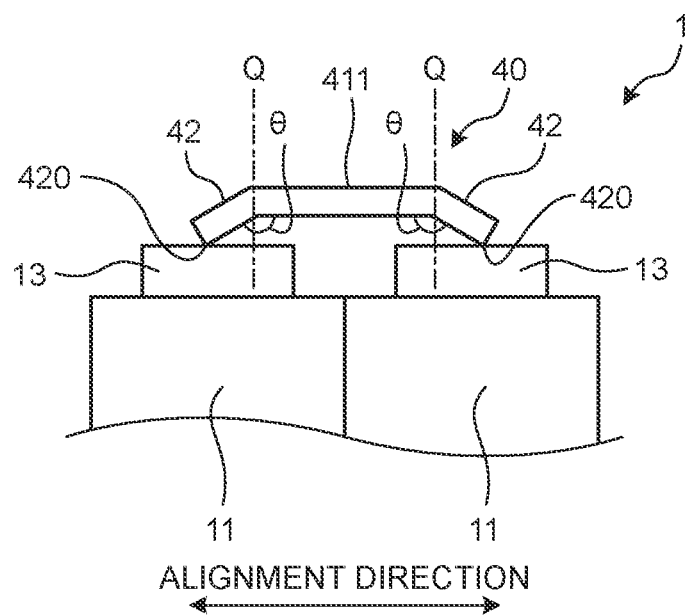
FIG. 2 is a front view illustrating an example of a configuration of a part of the battery pack according to the embodiment.
Figure 3:
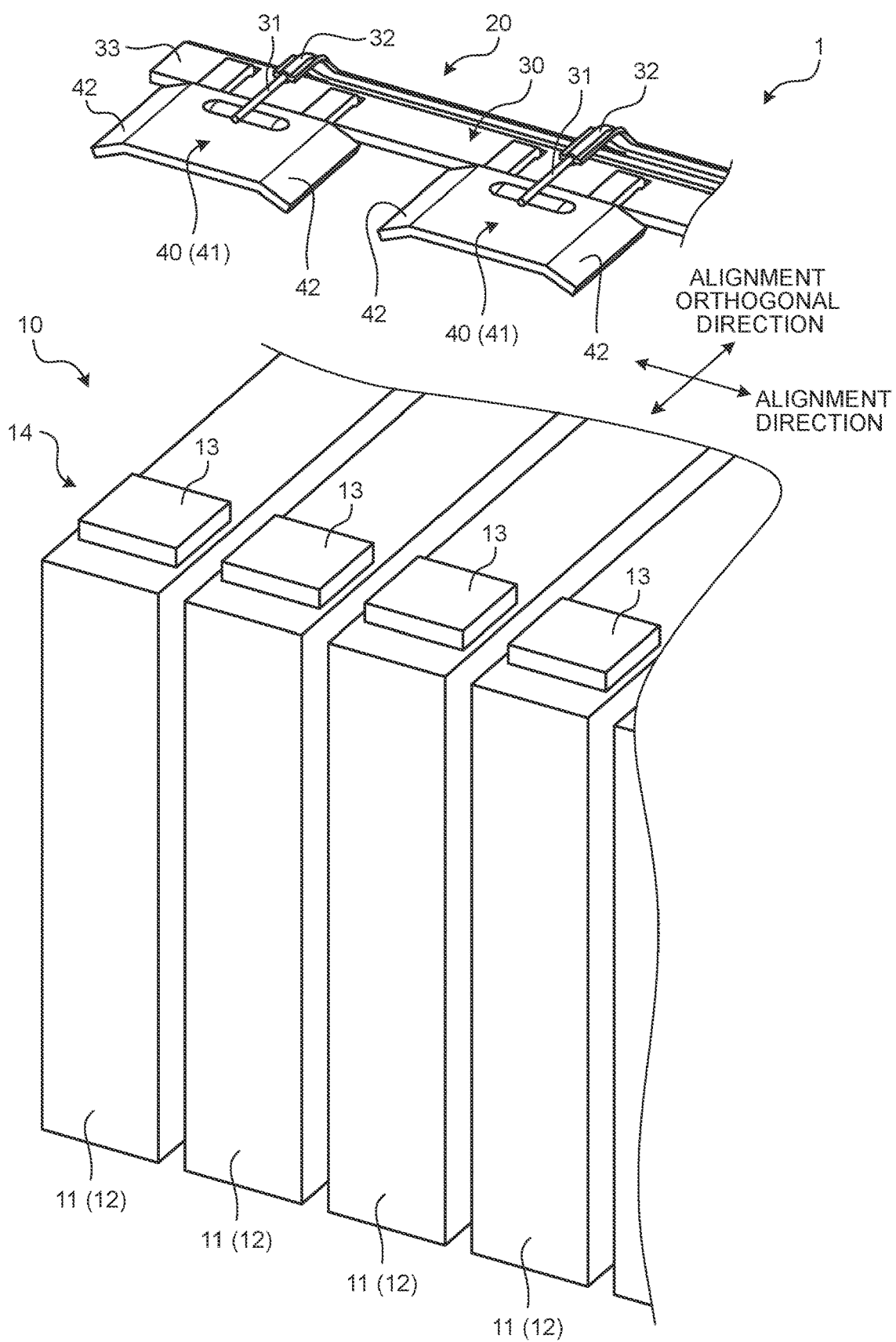
FIG. 3 is an exploded perspective view illustrating an example of a configuration of a part of the battery pack according to the embodiment.
Figure 4:
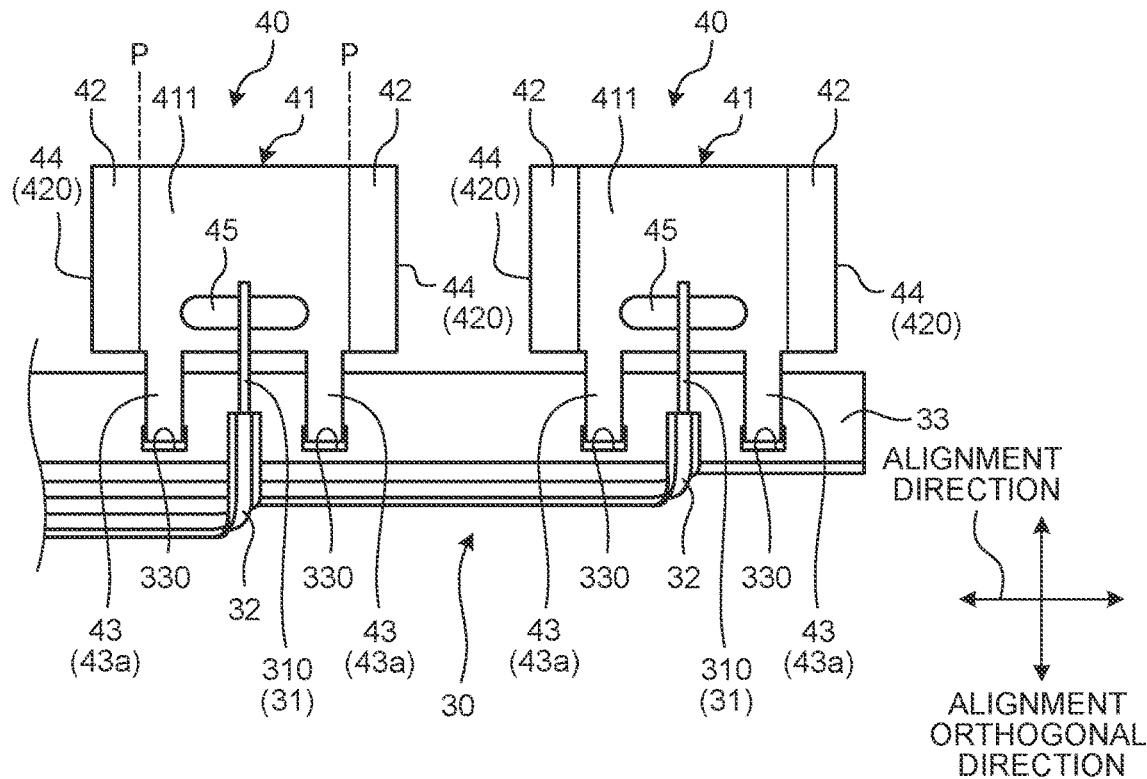
FIG. 4 is a plan view illustrating an example of a configuration of a part of a busbar module according to the embodiment.
Figure 5:
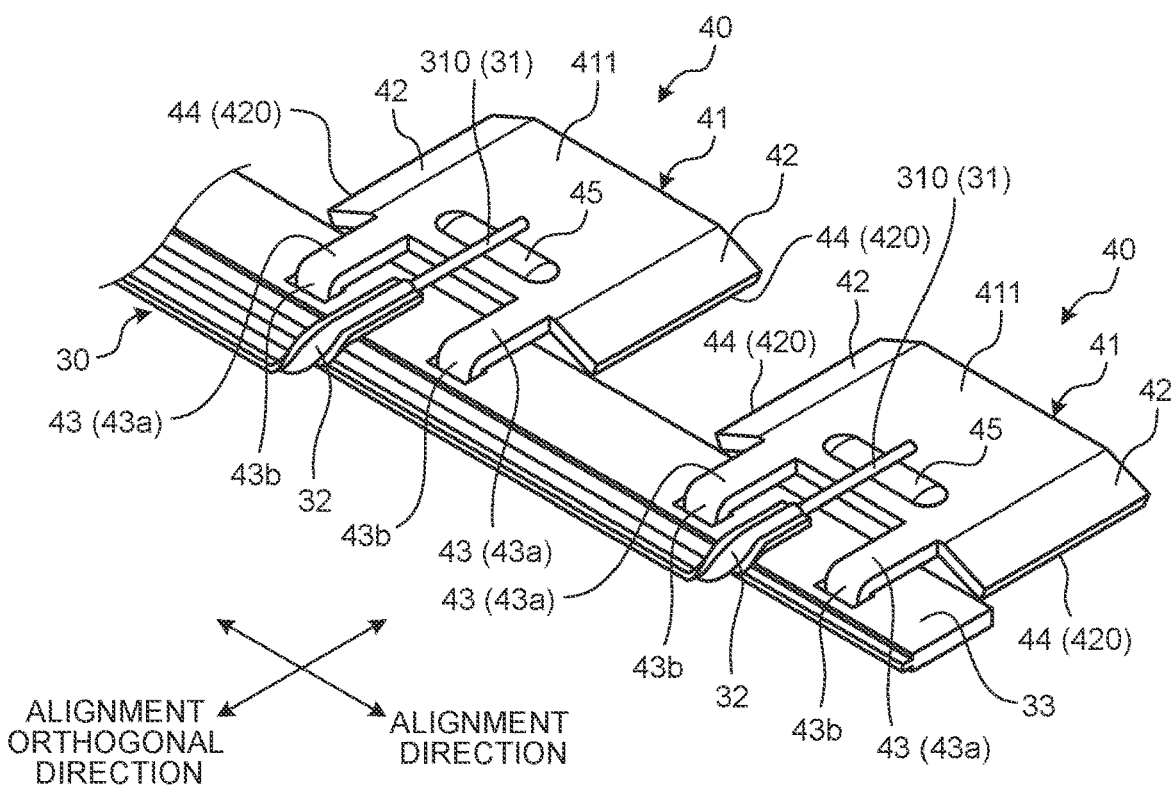
FIG. 5 is a perspective view illustrating an example of a configuration of a part of the busbar module according to the embodiment.
Figure 6:
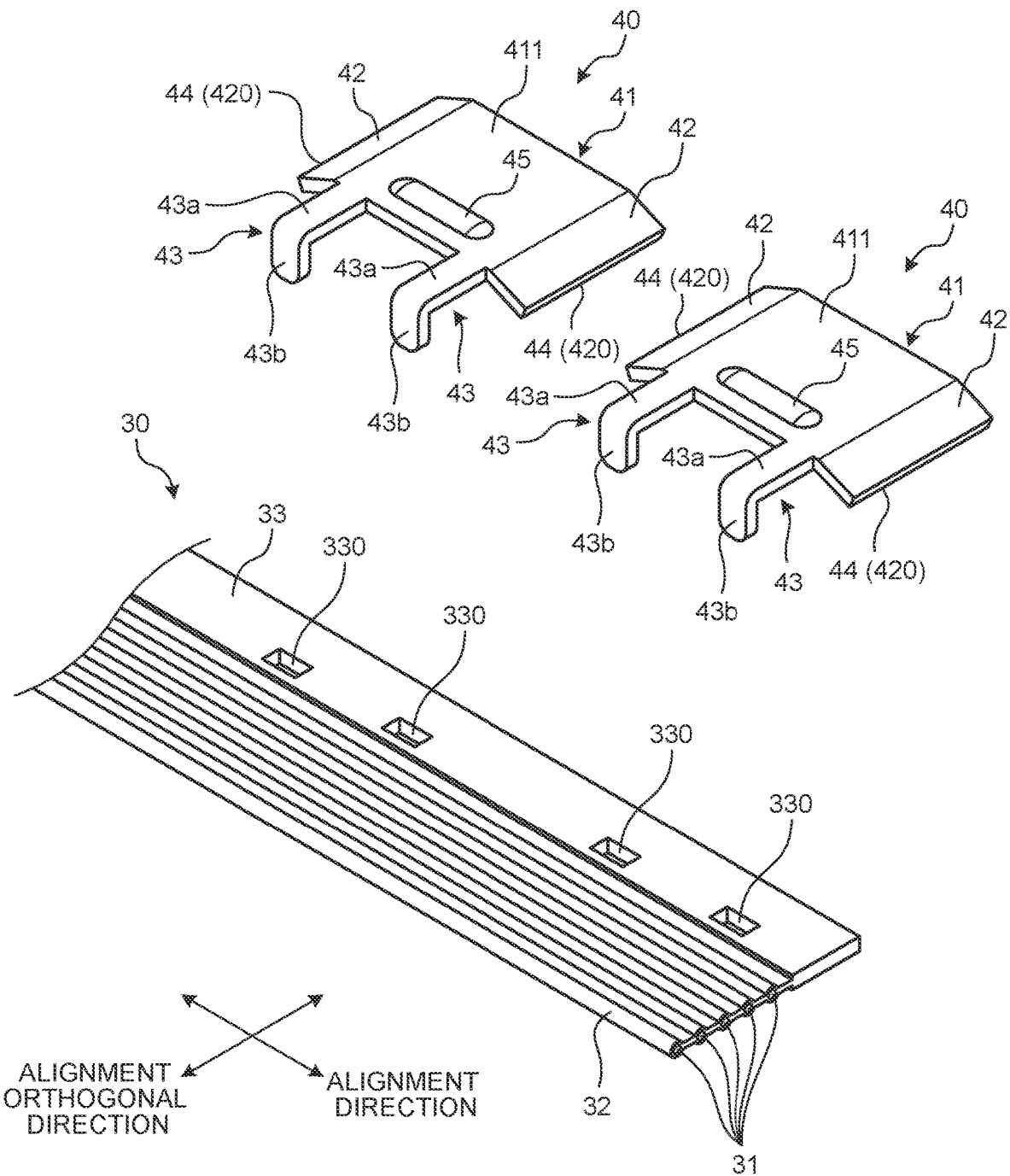
FIG. 6 is an exploded perspective view illustrating an example of a configuration of a part of the busbar module according to the embodiment.
Figure 7:
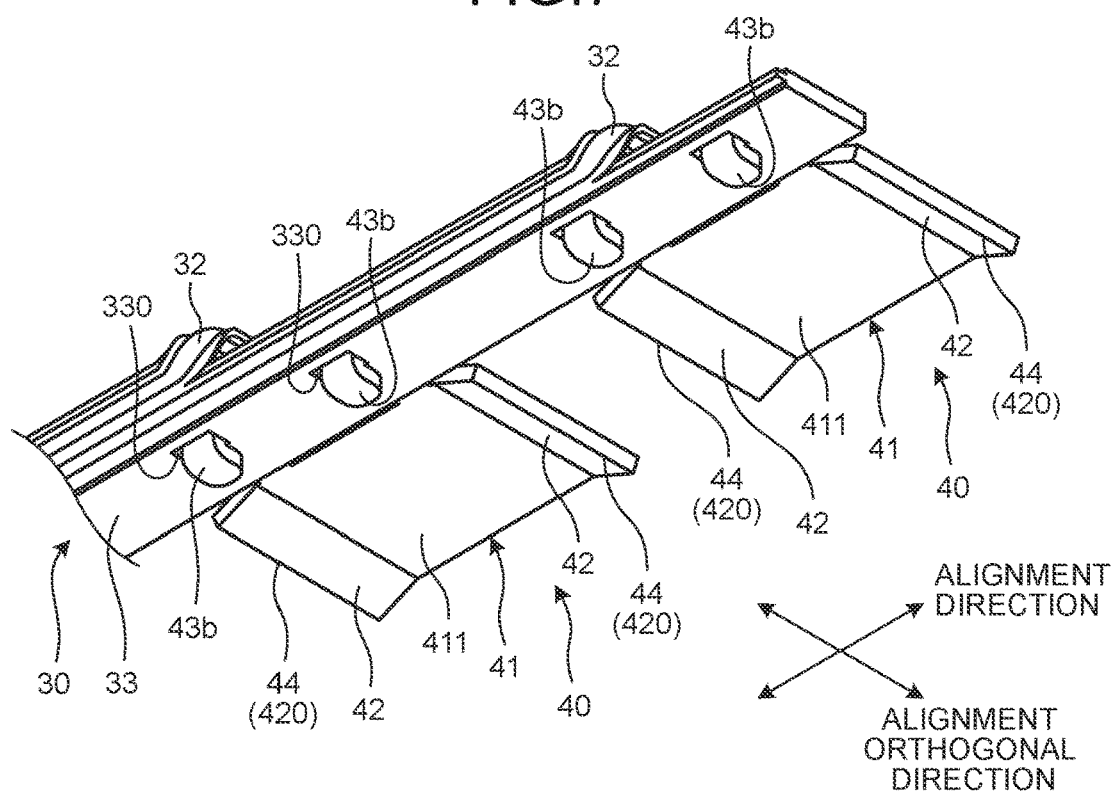
FIG. 7 is a bottom perspective view illustrating an example of a configuration of a part of the busbar module according to the embodiment.

First, a busbar module and a battery pack according to an embodiment of the present invention will be described. A battery pack 1 is an onboard battery for a vehicle such as an electric vehicle or a hybrid vehicle, and includes a battery module 10 and a busbar module 20 as illustrated in FIGS. 1 to 3. The battery module 10 is composed of a plurality of battery cells 11. The busbar module 20 is composed of a plurality of busbars 40 and a flat cable 30. The busbar module 20 electrically connects the battery cells 11 of the battery module 10 in series or in parallel. The battery pack 1 includes a housing, and the battery module 10 is housed in the housing with the battery cells 11 housed in chambers in the housing. The housing is not illustrated in the drawings of the present embodiment for convenience.

Each battery cell 11 has two electrode terminals 13 on an end of a cell body 12. The cell body 12 of the battery cell 11 has, for example, a rectangular parallelepiped shape, and the electrode terminals 13 are disposed on a surface of the cell body 12. In the examples of FIGS. 1 to 3, the surface on which the electrode terminals 13 are disposed faces the upper side of the vehicle. The battery cell 11 has two planer electrode terminals 13 disposed at both ends of the surface in the longitudinal direction thereof. One of the electrode terminals 13 is a positive electrode terminal and the other is a negative electrode terminal.

The battery cells 11 of the battery module 10 are arranged side by side so that one of the two electrode terminals 13 of each cell 11 is linearly aligned with one another and the other electrode terminal 13 of each cell 11 is linearly aligned with one another. In other words, the battery cells 11 constitute the battery module 10 and form an imaginary rectangular parallelepiped shape, and the battery module 10 has two electrode terminal groups 14 each composed of the electrode terminals 13 that are linearly aligned on a surface of the rectangular parallelepiped shape. An electrode terminal group 14 of the battery module 10 may be configured of positive electrode terminals 13 and negative electrode terminals 13 alternately arranged in a row, or configured of only positive electrode terminals 13 or negative electrode terminals 13 arranged in a row. The battery pack 1 according to the present embodiment includes the busbar module 20 provided for each electrode terminal group 14.

The busbar module 20 includes the flat cable 30 and the busbars 40 as described above. The busbars 40 are aligned in a direction in which the electrode terminals 13 are aligned, and are held by a busbar holder 33 of the flat cable 30 to be described later. The direction in which the busbars 40 are aligned is referred to as an alignment direction of the busbars 40. A direction orthogonal to the alignment direction of the busbars 40 on an imaginary plane composed of a plurality of linear conductors 31 of the flat cable 30 to be described later is referred to as an alignment orthogonal direction of the busbars 40. The electrode terminals 13 of each electrode terminal group 14 of the battery cells 11 are aligned in the same direction as the alignment direction of the busbars 40.

The flat cable 30 holds the busbars 40 and electrically connects the busbars 40 with a connector (not illustrated) of the flat cable 30. As illustrated in FIGS. 4 to 7, the flat cable 30 includes the linear conductors 31, a cover 32, and the busbar holder 33. The connector of the flat cable 30 is fitted to a counterpart connector and thus all the linear conductors 31 are connected with conductors of the counterpart connector. The flat cable 30 may be connected with the counterpart conductors by welding without using the connector.

The linear conductors 31 are used for, for example, detecting the voltage of the battery cells 11 as voltage detecting lines. The linear conductors 31 are made of, for example, copper alloy or aluminum alloy and are flexible enough to be processed by bending. The linear conductors 31 may be single wires such as flat conductors or round conductors, stranded wires, or other types of conductors. The linear conductors 31 are provided for the busbars 40 one by one. The linear conductors 31 are arranged on the same plane with their axes extending in the same direction and with a certain gap therebetween in the direction orthogonal to the axial direction. The axial direction of the linear conductors 31 agrees with the alignment direction of the busbars 40. The linear conductors 31 are arranged such that the imaginary plane composed of the linear conductors 31 is substantially parallel to the surface of a base portion 41 of each busbar 40 to be described later. When only a limited number of the linear conductors 31 can be arranged on the same plane, the linear conductors 31 may be arranged in a stack such that a certain number of linear conductors 31 arranged on the same plane as a set are stacked in the direction perpendicular to the plane.

The cover 32 covers the linear conductors 31. The cover 32 is made of, for example, a synthetic resin having an insulating property and flexibility. The cover 32 is made of, for example, a synthetic resin such as polypropylene (PP), polyvinyl chloride (PVC), polybutylene terephthalate (PBT), or polyethylene terephthalate (PET). The cover 32 covers the linear conductors 31 without changing their arrangement described above. The cover 32 covers the linear conductors 31 with a certain gap left therebetween and integrates them. For example, the cover 32 includes a circular tube portion that covers the individual linear conductor 31 and a rectangular flat portion that joins adjacent circular tube portions.

The busbar holder 33 is made of the same material as that of the cover 32 and is integrally formed with the cover 32. The busbar holder 33 has a planer rectangular shape. The busbar holder 33 extends, on the aforementioned imaginary plane, from an end of the cover 32 close to the busbars 40 to the direction orthogonal to the axial direction of the linear conductors 31. The busbar holder 33 has retainer holes 330 that retain the busbars 40 and are provided for each busbar 40. The retainer holes 330 corresponding to each busbar 40 are arranged in the axial direction of the linear conductors 31, and fixing portions 43 of the busbar 40 to be described later are fixed to the retainer holes 330.

Each busbar 40 electrically connects two electrode terminals 13 adjacent to each other in an electrode terminal group 14. The busbars 40 are aligned in the alignment direction of the electrode terminals 13 of each electrode terminal group 14, and are fixed to the busbar holder 33 of the flat cable 30. The busbars 40 are formed by pressing such as punching or bending performed on a planar conductor (not illustrated) that is a base material of the busbars 40. The planar conductor is a rectangular long metal plate made of, for example, copper, copper alloy, aluminum, aluminum alloy, gold, or stainless steel (SUS). Each busbar 40 has the base portion 41 and two connection portions 42. The base portion 41 includes a base body 411 and the fixing portions 43. The connection portions 42 of each busbar 40 are provided in the alignment direction of the busbars 40 with the base body 411 interposed therebetween. In other words, the base body 411 of each busbar 40 is located between the connection portions 42 that are provided in the alignment direction of the busbars 40. The connection portions 42 each share a boundary with the base body 411 that extends in an alignment crossing direction that the alignment direction of the busbars 40 crosses. Both edges 44 of the busbar 40 in the alignment direction are bent toward the electrode terminals 13 with the boundary is used as a bending origin P to form the connection portions 42. It is preferred that the boundary between the base body 411 and each of the connection portions 42 extends in the alignment orthogonal direction that is orthogonal to the alignment direction of the busbars 40, and is used as the bending origin P. The fixing portions 43 of the busbar 40 extend from an edge of the base body 411 close to the flat cable 30. The configuration of each busbar 40 will be fully described below.

The connection portions 42 are connected to the electrode terminals 13 adjacent to each other. The connection portions 42 correspond to portions in which both edges 44 of the busbar 40 in the alignment direction are bent toward the electrode terminals 13 form the bending origin P. Each connection portion 42 is defined by an end (bending origin P) of the base body 411 and an edge 420 of the connection portion 42 in the alignment direction of the busbars 40. When seen from the alignment orthogonal direction of the busbars 40, the connection portions 42 downwardly and outwardly extend from the base body 411 to incline relative to the base body 411. When seen from the alignment orthogonal direction of the busbars 40, the connection portions 42 are preferably positioned away from the base body 411 relative to reference lines Q (see FIG. 2) that are orthogonal to the aforementioned imaginary plane and pass through the bending origins P. In other words, when the connection portions 42 are seen from the alignment orthogonal direction of the busbars 40, an angle θ between the base body 411 and each connection portion 42 is preferably an obtuse angle. The two connection portions 42 may be bent toward the electrode terminals 13 at the same angle, or may be bent toward the electrode terminals 13 at different angles. Alternatively, only one of the connection portions 42 may be bent toward the electrode terminals 13. The connection portions 42, which are bent toward the electrode terminals 13, protrude toward the electrode terminals 13 relative to the base body 411. The design value of the pitch between the two connection portions 42 agrees with the design value of the pitch between the two electrode terminals 13 adjacent to each other. For example, the design value of the pitch between the edges 420 of the connection portions 42 agrees with the design value of the pitch between the centers of the adjacent electrode terminals 13 in the alignment direction thereof. The edges 420 of the connection portions 42 are directly joined to the respective electrode terminals 13. Examples of the method for directly joining the edges 420 to the electrode terminals 13 include resistance welding, ultrasonic bonding, laser bonding, and other known methods. For example, voltage is applied to the edges 420 of the connection portions 42 with the edges 420 being in contact with the electrode terminals 13, and heat generated by the resistance of the edges 420 melts the edges 420, thereby joining the edges 420 of the connection portions 42 to the electrode terminals 13.

The fixing portions 43 have a strip shape and are used to fix the busbar 40 to the flat cable 30. Each busbar 40 has two fixing portions 43 in the alignment direction of the busbars 40. The distance between the fixing portions 43 is substantially the same as the distance between the retainer holes 330 of the flat cable 30. Each fixing portion 43 has a support 43*a* and a hook portion 43*b* (see FIG. 6). The support 43*a* extends in the alignment orthogonal direction of the busbars 40 along the upper surface of the busbar holder 33 (a surface away from the electrode terminals 13) from an end of the base body 411 close to the flat cable 30. The hook portion 43*b* extends from an end of the support 43*a* away from the base body 411 to the corresponding retainer hole 330 in a direction orthogonal to the upper surface (imaginary plane) of the base body 411. The hook portions 43*b* of the fixing portions 43 are inserted into the retainer holes 330 and are bent toward the busbar holder 33 from the base (joint between the hook portion 43*b* and the support 43*a*) so that the supports 43*a* and the hook portions 43*b* sandwich the busbar holder 33. The fixing portions 43 thus fix the busbar 40 to the flat cable 30.

An end of a linear conductor 31 is connected to the base body 411 of the base portion 41. For example, the base portion 41 includes a busbar terminal 45. The busbar terminal 45 is disposed on the upper surface of the base body 411 and the linear conductor 31 is connected thereto. The busbar terminal 45 is a raised portion on the upper surface of the base body 411, and has, for example, a height corresponding to the thickness of the cover 32 that covers the linear conductor 31. An end of the linear conductor 31 corresponding to the busbar 40 is electrically connected to the busbar terminal 45 by welding or brazing. For example, the linear conductor 31 corresponding to the busbar 40 is bent toward the busbar 40 and an end 310 of the linear conductor 31 is connected to the busbar terminal 45. In this case, the cover 32 is stripped from the end 310 of the linear conductor 31, and the bare end 310 is connected to the busbar terminal 45. The linear conductor 31 and the busbar 40 may be electrically connected with each other by using a conductor member (not illustrated) prepared for this purpose.

Figure 8:
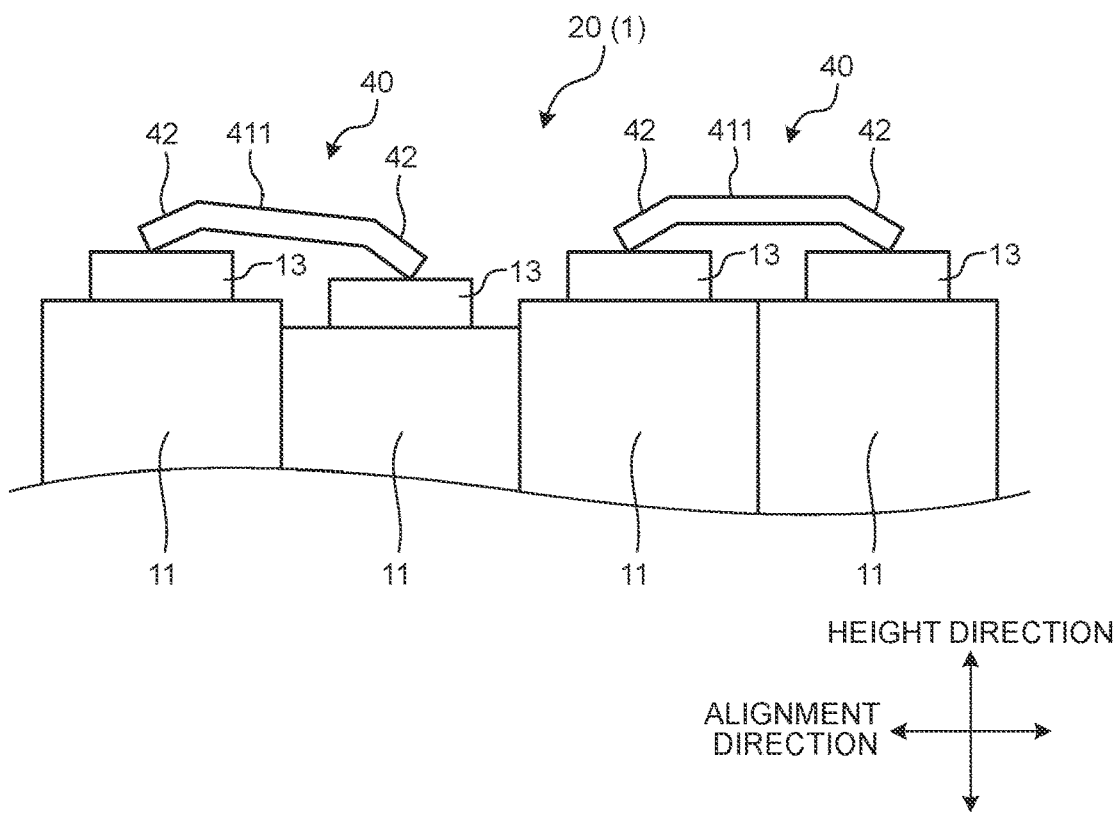
FIG. 8 is a front view illustrating an example of a function of the busbar module according to the embodiment.

As illustrated in FIG. 8, when the electrode terminals 13 adjacent to each other are at the same height position in the height direction of the battery cells 11, the busbar module 20 allows the two connection portions 42 to contact the electrode terminals 13 without rotating the busbar 40. In other words, when the electrode terminals 13 adjacent to each other are at the same height position, the busbar module 20 allows the two connection portions 42 to be in contact with the electrode terminals 13 with the base body 411 of the busbar 40 being substantially parallel to the aforementioned imaginary plane. When the electrode terminals 13 adjacent to each other are at different height positions in the height direction of the battery cells 11, the busbar module 20 allows the two connection portions 42 to contact the electrode terminals 13 by rotating the busbar 40 in accordance with the height positions of the electrode terminals 13. When seen from the alignment orthogonal direction of the busbars 40, for example, the busbar module 20 allows the two connection portions 42 to contact the electrode terminals 13 adjacent to each other by rotating the busbar 40 about a rotation axis located, for example, between the connection portions 42. The location of the rotation axis of the busbar 40 varies depending on the difference in the height positions of the electrode terminals 13. Even when the busbar 40 rotates in accordance with the height positions of the electrode terminals 13, the busbar module 20 can prevent the base body 411 from contacting the electrode terminals 13 because the connection portions 42 protrude toward the electrode terminals 13 relative to the base body 411. With this configuration, the busbar module 20 can bring the connection portions 42 of the busbar 40 into contact with the electrode terminals 13 without fail even when the electrode terminals 13 are at different height positions.

As described above, the busbar module 20 and the battery pack 1 according to the present embodiment include the busbars 40 at least one of the connection portions 42 of which protrudes toward the electrode terminals 13 relative to the base portion 41 located between the connection portions 42. Conventional busbar modules include planar busbars having the base portion and the connection portions on the same plane. With such a conventional busbar module, it takes much time for a factory worker to connect the connection portions to the electrode terminals 13 when the electrode terminals 13 are at different height positions in the height direction of the battery cells 11. It is because that the busbar rotates depending on the height positions of the contact points and the base portion which is on the same plane as the connection portions contacts to the electrode terminals 13. The busbar module 20 according to the present embodiment includes the busbars 40 the connection portions 42 of which protrude toward the electrode terminals 13 relative to the base portion 41. This configuration enables the factory worker to easily and directly join the connection portions 42 of the busbars 40 to the electrode terminals 13 without causing the base portion 41 to contact the electrode terminals 13 even when the electrode terminals 13 are at different height positions. Thus, the factory worker can more easily assemble the busbar module 20. The busbar module 20 can prevent the base portion 41 from contacting the electrode terminals 13 when the electrode terminals 13 are at different height positions, which leads to a reduction in the load on the busbar holder 33. To further reduce the load on the busbar holder 33, the busbar module 20 may be provided with a space between the retainer hole 330 of the busbar holder 33 and the hook portion 43b of the fixing portion 43. Such a space in the busbar module 20 allows the hook portion 43b of the fixing portion 43 to be freely fit to the retainer hole 330. With this configuration, the busbar holder 33 does not have much load when the busbar 40 rotates.

In the busbar module 20, the connection portions 42 each share a boundary with the base portion 41 that extends in an alignment crossing direction that the alignment direction of the busbars 40 crosses. The connection portions 42 have a shape in which both edges 44 of the busbar 40 in the alignment direction are bent toward the electrode terminals 13 with the boundary is used as a bending origin P. With this configuration, the connection portions 42 of the busbar module 20 can be easily formed by only bending the busbar 40 such that the edges 44 of the busbar 40 come close to the electrode terminals 13.

In the busbar module 20, an end of the linear conductor 31 is connected to the base portion 41. It is preferred that, for example, the end of the linear conductor 31 is connected to the center of the base portion 41 in the alignment direction of the busbars 40 in the busbar module 20. Thus, the end of the linear conductor 31 is located on or near the rotation axis of the busbar 40. When the electrode terminals 13 are at different height positions in the height direction of the battery cells 11, this configuration can prevent the linear conductor 31 from rotating together with the busbar 40 that rotates in accordance with the height positions of the electrode terminals 13. The busbar module 20 thus can reduce the load on the linear conductor 31.

Described next are first to sixth modifications of the embodiment. In the first to the sixth modifications, the same reference signs are given to the same components as those in the embodiment, and duplicate explanations thereof are omitted.

First Modification

Figure 9:
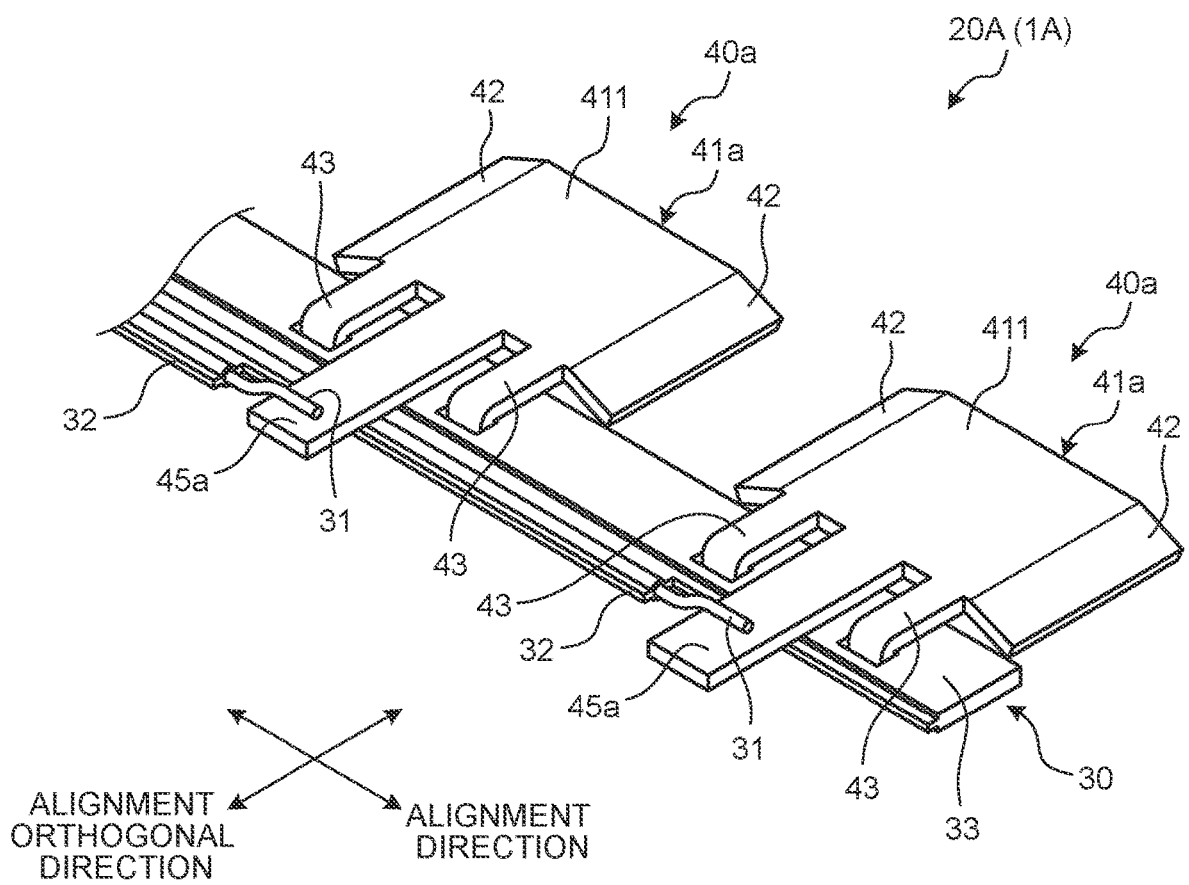
FIG. 9 is a perspective view illustrating an example of a configuration of a part of a busbar module according to a first modification of the embodiment.
Figure 10:
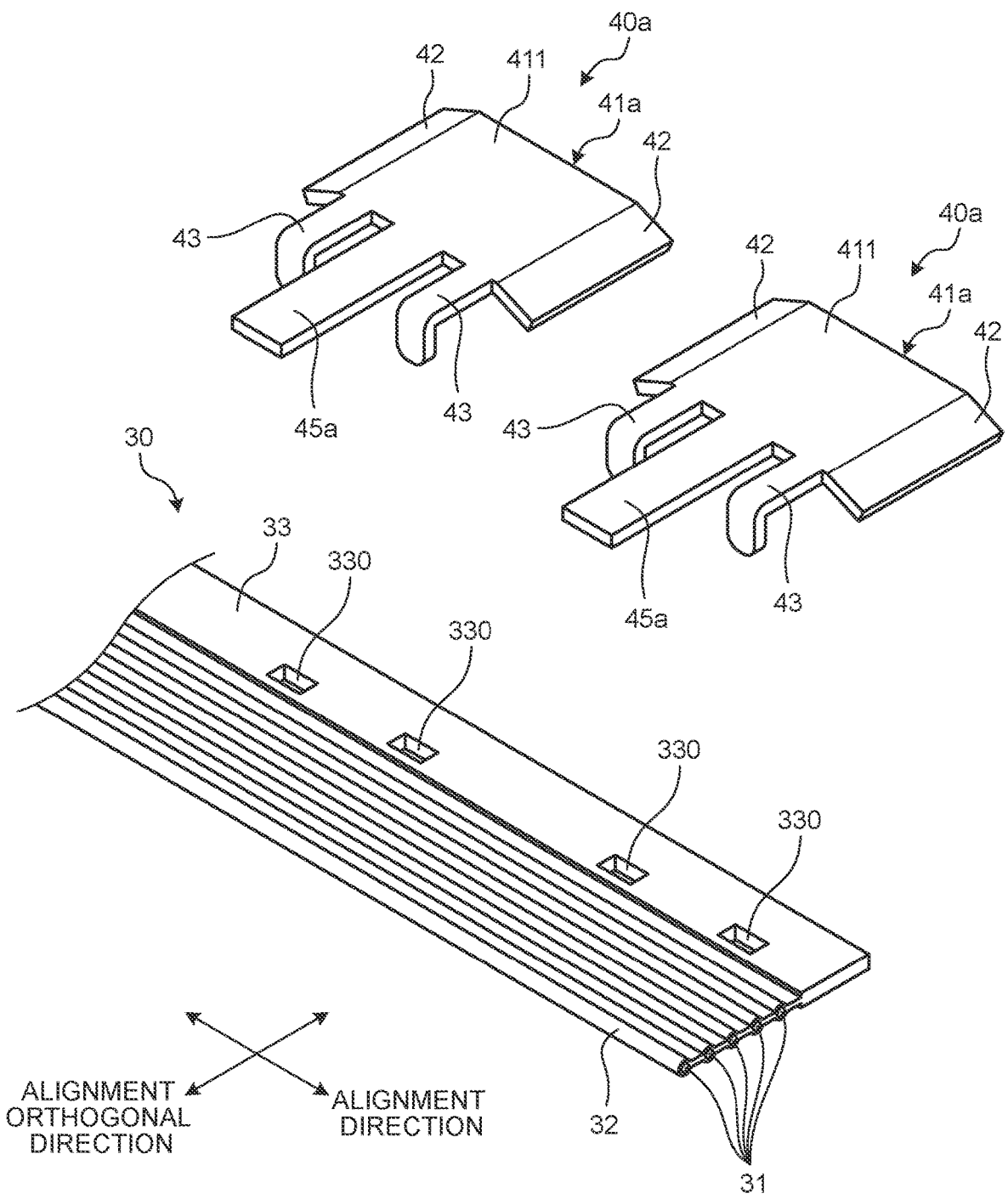
FIG. 10 is an exploded perspective view illustrating an example of a configuration of a part of the busbar module according to the first modification.

First, the first modification of the embodiment will be described. As illustrated in FIGS. 9 and 10, a busbar terminal 45a according to the first modification to which the linear conductor 31 is connected is disposed in a position different from that in the embodiment. In a busbar module 20A according to the first modification, a base portion 41a of a busbar 40a has the busbar terminal 45a. The busbar terminal 45a has a planar rectangular shape and is provided between the fixing portions 43. For example, the busbar terminal 45a is provided at substantially the center of the base body 411 when the busbar 40a is seen from the alignment orthogonal direction. The busbar terminal 45a extends from an end of the base body 411 close to the flat cable 30 in the alignment orthogonal direction of the busbars 40a along the upper surface of the flat cable 30 (a surface away from the electrode terminals 13) and has a length that is substantially the same as the width of the flat cable 30. An end of a corresponding linear conductor 31 is connected to the upper surface (a surface not facing the flat cable 30) of the busbar terminal 45a. With this configuration, the busbar module 20A and a battery pack 1A according to the first modification have the same effect as that of the embodiment. The end of the linear conductor 31 connected to the busbar terminal 45a is located on or near the rotation axis of the busbar 40a, and the busbar terminal 45a is located away from the base body 411. This configuration can prevent the linear conductor 31 from rotating together with the rotation of the busbar 40a. Thus, the busbar module 20A and the battery pack 1A can further reduce the load on the linear conductor 31. The busbar terminal 45a extending from an end of the base body 411 close to the flat cable 30 in the alignment orthogonal direction of the busbars 40a may have a different length in accordance with the corresponding linear conductor 31.

Second Modification

Figure 11:
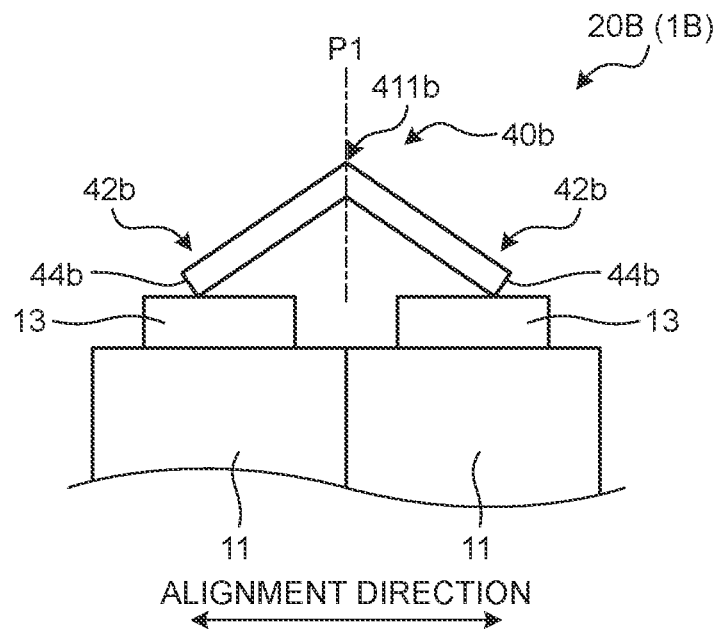
FIG. 11 is a front view illustrating an example of a configuration of a part of a busbar module (battery pack) according to a second modification of the embodiment.

Described next is the second modification of the embodiment. As illustrated in FIG. 11, a busbar 40b according to the second modification includes a base body 411b and connection portions 42b having a shape different from the shape of the base body 411 and the connection portions 42 according to the embodiment. The connection portions 42b of the busbar 40b have a shape in which both edges 44b of the busbar 40b in the alignment direction are bent toward the electrode terminals 13 along the alignment orthogonal direction of the busbars 40b with the center of the busbar 40b in the alignment direction of the busbars 40b is used as a bending origin P1. The connection portions 42b are directly joined to the electrode terminals 13. The base body 411b is located between the connection portions 42b and, for example, is a portion corresponding to the bending origin P1 along which the busbar 40b is bent. The connection portions 42b protrude toward the electrode terminals 13 relative to the base body 411b. With this configuration, a busbar module 20B and a battery pack 1B according to the second modification have the same effect as that of the embodiment.

Third Modification

Figure 12:
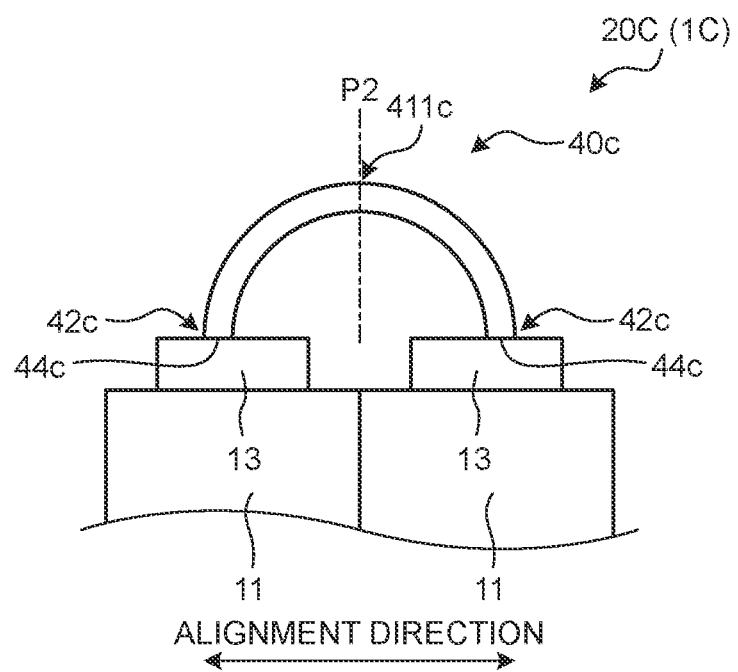
FIG. 12 is a front view illustrating an example of a configuration of a part of a busbar module (battery pack) according to a third modification of the embodiment.

Described next is the third modification of the embodiment. As illustrated in FIG. 12, a busbar 40c according to the third modification includes a base body 411c and connection portions 42c having a shape different from the shape of the base body 411 and the connection portions 42 according to the embodiment. The connection portions 42c of the busbar 40c have a shape in which both edges 44c of the busbar 40c in the alignment direction are curved from a bending origin P2 toward the electrode terminals 13 along the alignment orthogonal direction of the busbars 40c with the center of the busbar 40c in the alignment direction of the busbars 40c is used as a bending origin P2 to bend curvedly. The connection portions 42c are directly joined to the electrode terminals 13. The base body 411c is located between the connection portions 42c and, for example, is a portion corresponding to the bending origin P2 from which the busbar 40c is curved. The connection portions 42c protrude toward the electrode terminals 13 relative to the base body 411c. With this configuration, a busbar module 20C and a battery pack 1C according to the third modification have the same effect as that of the embodiment.

Fourth Modification

Figure 13:
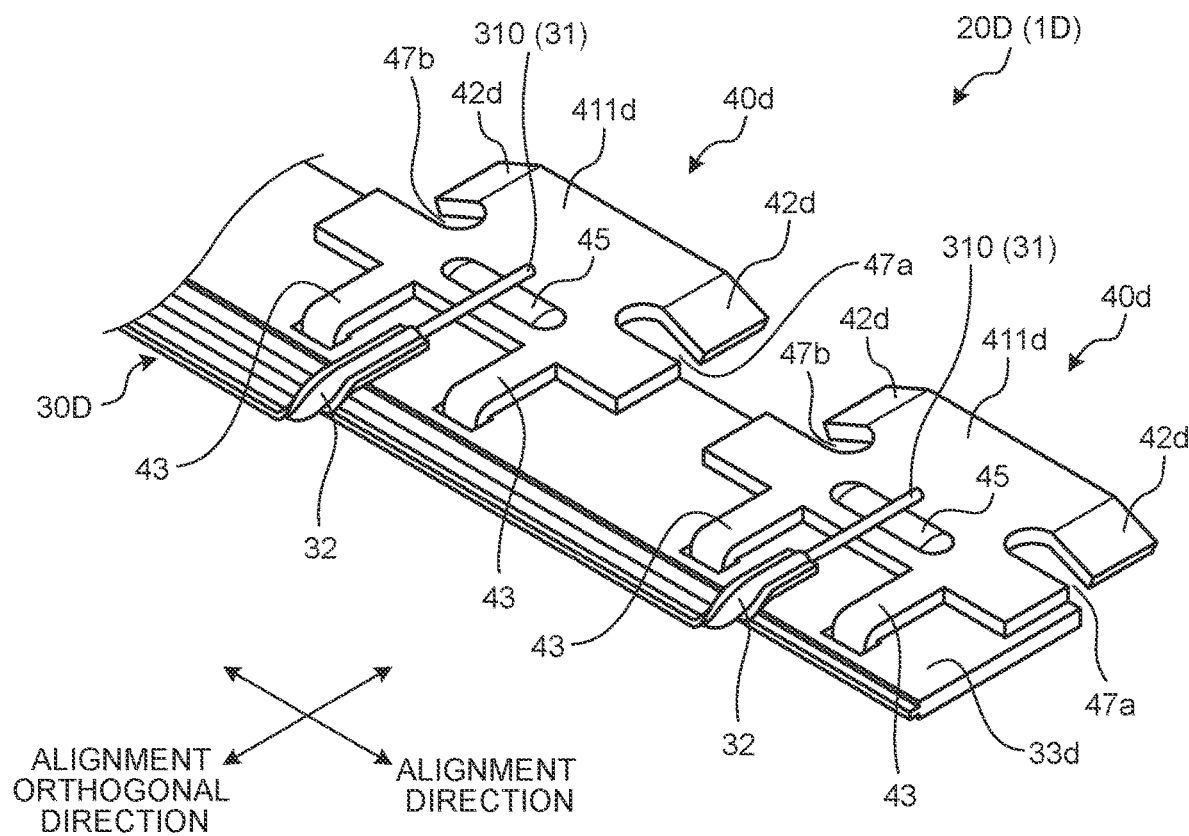
FIG. 13 is a perspective view illustrating an example of a configuration of a part of a busbar module according to a fourth modification of the embodiment.
Figure 14:
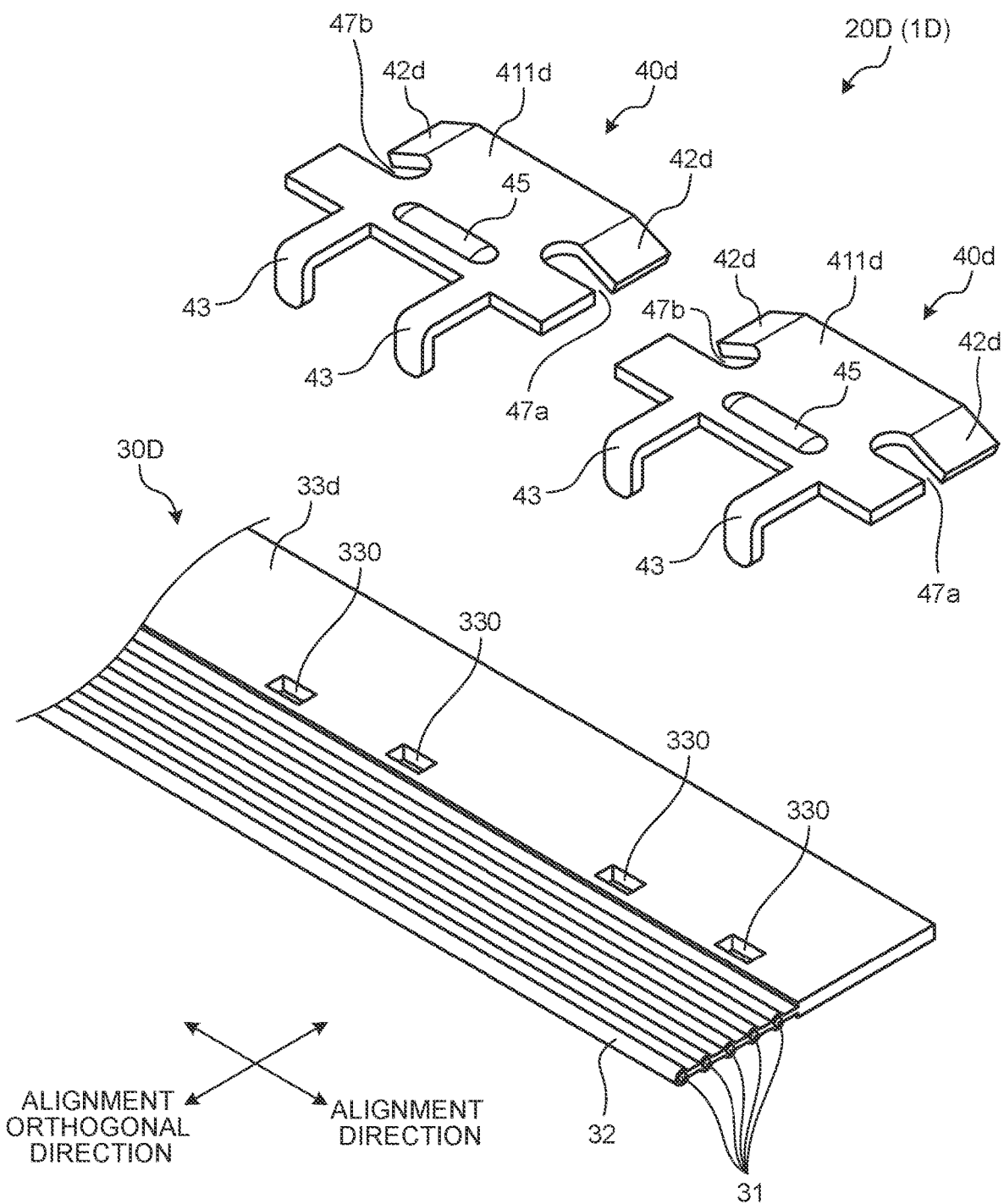
FIG. 14 is an exploded perspective view illustrating an example of a configuration of a part of the busbar module according to the fourth modification.

Described next is the fourth modification of the embodiment. As illustrated in FIGS. 13 and 14, a busbar 40d according to the fourth modification includes a base body 411d and connection portions 42d having a shape different from the shape of the base body 411 and the connection portions 42 according to the embodiment. The busbar 40d according to the fourth modification is arranged such that an end of the base body 411d close to a busbar holder 33d of a flat cable 30D overlaps the busbar holder 33d. The busbar 40d has a first cutout portion 47a at an end in the alignment direction of the busbars 40d at which a part of the busbar 40d is cut out and a second cutout portion 47b at the other end in the alignment direction of the busbars 40d at which a part of the busbar 40d is cut out. The first and the second cutout portions 47a and 47b of the busbar 40b are provided at a part that at least does not overlap the busbar holder 33d. The connection portions 42d of the busbar 40d are separated by the first and the second cutout portions 47a and 47b in the alignment orthogonal direction of the busbars 40d and located away from the busbar holder 33d. The connection portions 42d are formed by bending the busbar 40d along the alignment orthogonal direction of the busbars 40d toward the electrode terminals 13. The base body 411d is located between the connection portions 42d. The connection portions 42d protrude toward the electrode terminals 13 relative to the base body 411d. With this configuration, a busbar module 20D and a battery pack 1D according to the fourth modification have the same effect as that of the embodiment even when the base body 411d overlaps the busbar holder 33d.

Fifth Modification

Figure 15:
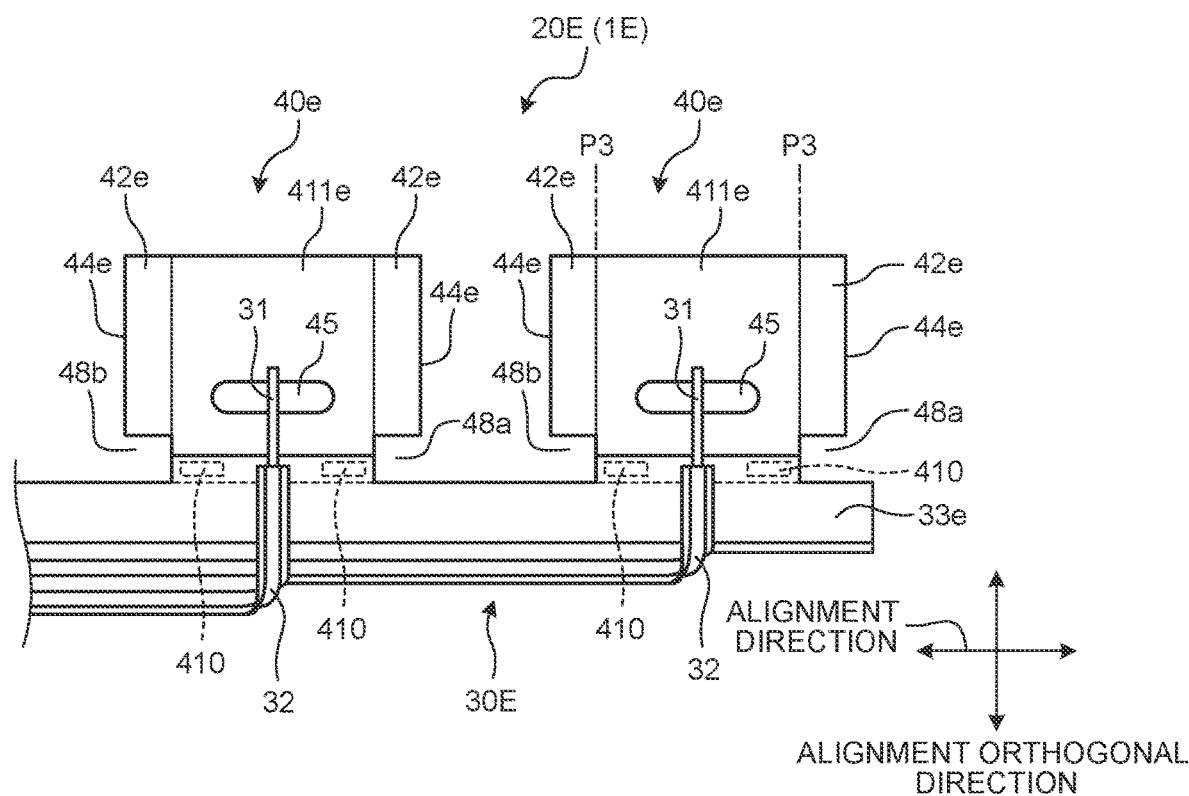
FIG. 15 is a plan view illustrating an example of a configuration of a part of a busbar module according to a fifth modification of the embodiment.

Described next is the fifth modification of the embodiment. As illustrated in FIG. 15, the fifth modification differs from the embodiment in that the busbars 40e and the linear conductors 31 are integrally formed by extrusion molding. A busbar module 20E according to the fifth modification is manufactured as follows: The linear conductors 31, a planar conductor from which the busbars 40e will be formed, and an insulating resin material that covers the linear conductors 31 and integrates the linear conductors 31 and the planar conductor are co-extruded, and then, for example, punching is performed on the planar conductor. A flat cable 30E of the busbar module 20E includes a busbar holder 33e that holds the busbars 40e. The busbar holder 33e holds an end of each busbar 40e close to the flat cable 30E. Each busbar 40e has a first cutout portion 48a at an end in the alignment direction of the busbars 40e at which a part of the busbar 40e is cut out and a second cutout portion 48b at the other end in the alignment direction of the busbars 40e at which a part of the busbar 40e is cut out. The first and the second cutout portions 48a and 48b of the busbar 40e are provided at a part that is at least not held by the busbar holder 33e. In the example of FIG. 15, the first and the second cutout portions 48a and 48b of the busbar 40e are provided at an end of the busbar 40e close to the busbar holder 33e in the alignment orthogonal direction of the busbars 40e. The connection portions 42e each have a boundary that extends in the alignment orthogonal direction of the busbars 40e and crosses the first and the second cut-out portions 48a and 48b. Both edges 44e of the busbar 40e in the alignment direction are bent toward the electrode terminals 13 with the boundary is used as a bending origin P3 to form the connection portions 42e. A base body 411e is located between the connection portions 42e. The connection portions 42e protrude toward the electrode terminals 13 relative to the base body 411e. With this configuration, the busbar module 20E and a battery pack 1E according to the fifth modification have the same effect as that of the embodiment even when the busbars 40e and the flat cable 30E are integrally formed with each other. Each busbar 40e has through holes 410 at a part held by the busbar holder 33e. The through holes 410 are filled with the insulating resin material, which can securely join the busbars 40e to the busbar holder 33e.

Sixth Modification

Figure 16:
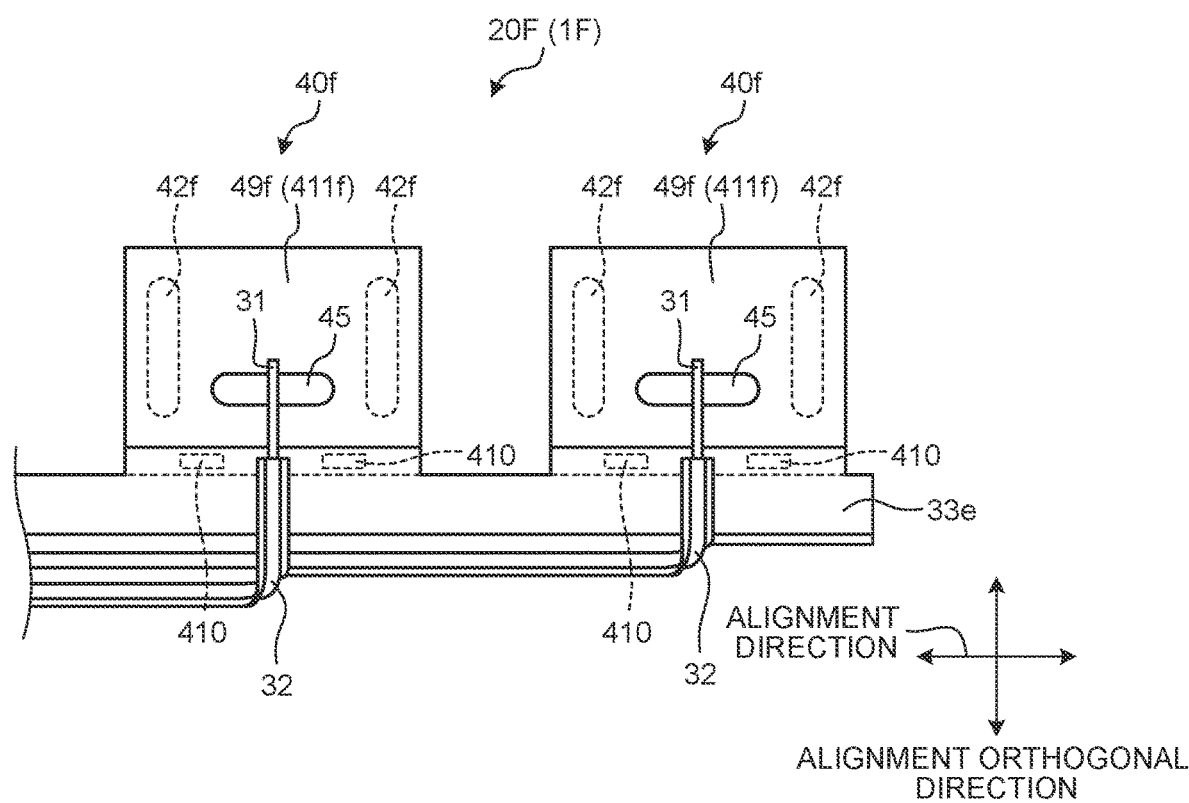
FIG. 16 is a plan view illustrating an example of a configuration of a part of a busbar module according to a sixth modification of the embodiment.
Figure 17:
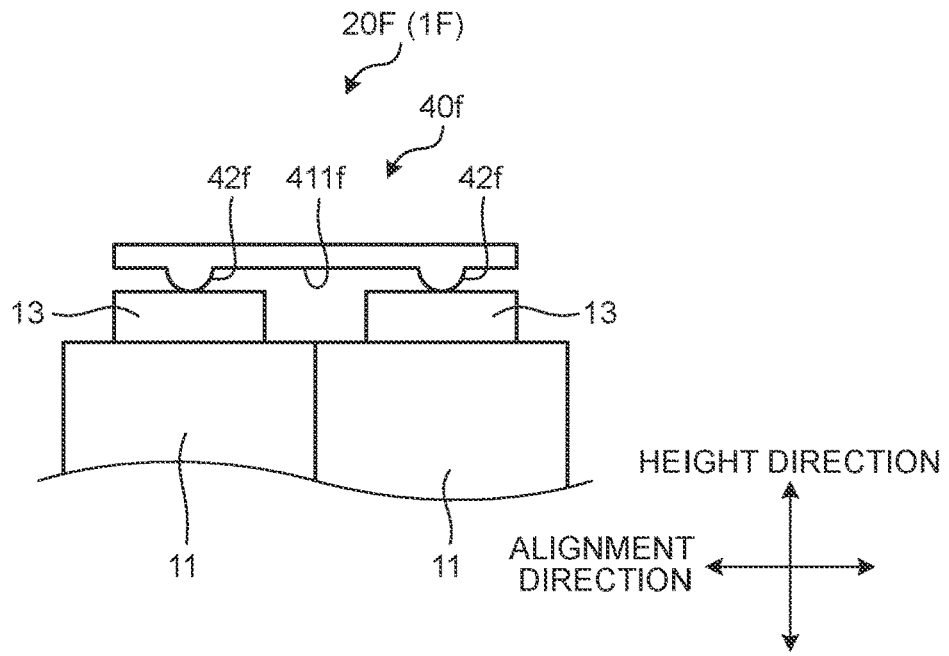
FIG. 17 is a front view illustrating an example of a configuration of a part of the busbar module (battery pack) according to the sixth modification.
Figure 18:
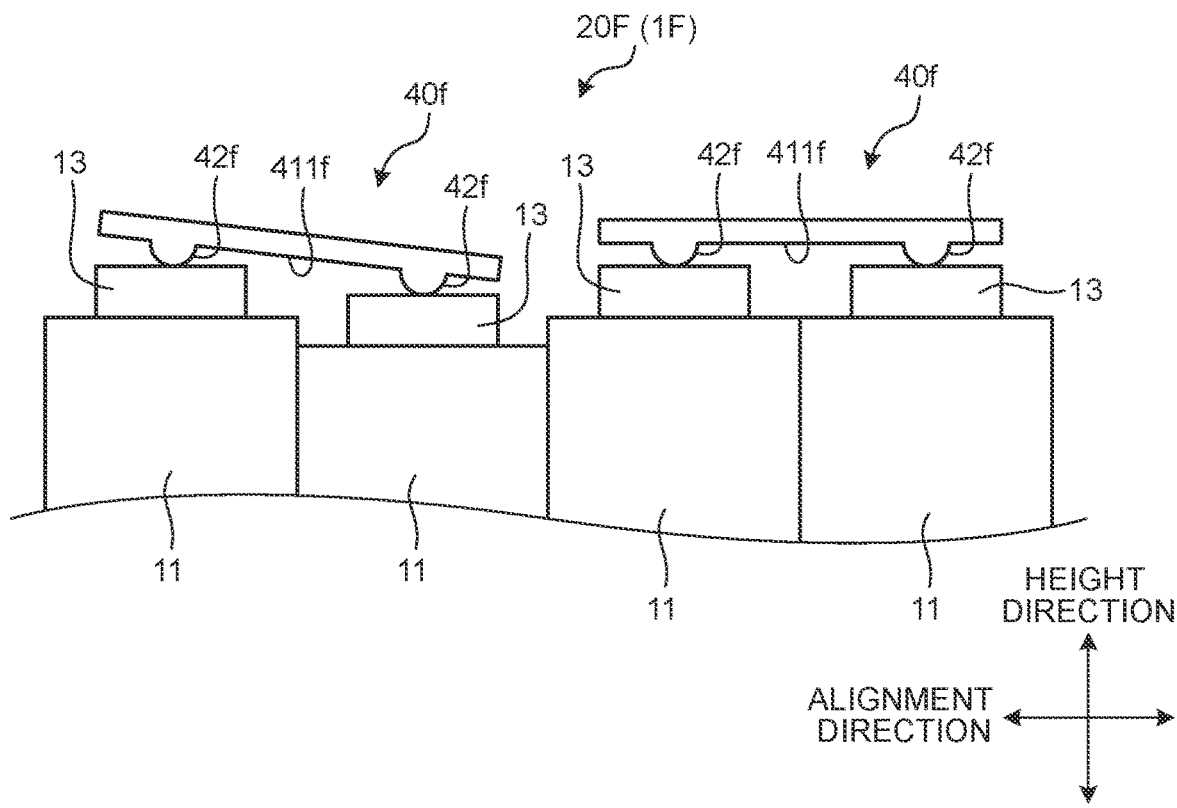
FIG. 18 is a front view illustrating an example of a function of the busbar module (battery pack) according to the sixth modification.

Described next is a sixth modification of the embodiment. As illustrated in FIGS. 16 and 17, the sixth modification differs from the embodiment in that protruding connection portions (indents) 42f are included. A busbar 40f according to the six modification includes a base body 49f made of a metal plate, which is the base material of the busbars 40f and has a planar rectangular shape, two protruding connection portions 42f disposed, in the alignment direction of the busbars 40f, on a surface of the base body 49f facing the electrode terminals 13, and a base body 411f that is a part of the base body 49f and is located between the two connection portions 42f. Each connection portion 42f extends in the alignment orthogonal direction of the busbars 40f and has a curved surface. Each connection portion 42f has, for example, a semicircular shape when seen from the alignment orthogonal direction of the busbars 40f. The connection portions 42f protrude toward the electrode terminals 13 relative to the base body 411f. The design value of the pitch between the two connection portions 42f agrees with the design value of the pitch between two electrode terminals 13 adjacent to each other. As illustrated in FIG. 18, when electrode terminals 13 adjacent to each other are at the same height position in the height direction of the battery cells 11, a busbar module 20F and a battery pack 1F according to the sixth modification allow the two connection portions 42f to contact the electrode terminals 13 without rotating the busbar 40f. When electrode terminals 13 adjacent to each other are at different height positions in the height direction of the battery cells 11, the busbar module 20F allows a part of the curved surface of each connection portion 42f to contact a corresponding electrode terminal 13 by rotating the busbar 40f in accordance with the height of contact points. When the busbar 40f rotates in accordance with the height positions of the electrode terminals 13, the busbar module 20F can prevent the base body 411f from contacting the electrode terminals 13 because the connection portions 42f protrude toward the electrode terminals 13 relative to the base body 411f. With this configuration, the busbar module 20F can bring the connection portions 42f of the busbar 40f into contact with the electrode terminals 13 without fail even when the electrode terminals 13 are at different height positions.

The protruding connection portions (indents) may have a dot shape. As illustrated in FIG. 19, for example, a busbar 40g includes connection portions 42g having a curved surface and protruding toward the electrode terminals 13 relative to a base body 411g. The design value of the pitch between the two connection portions 42g agrees with the design value of the pitch between two electrode terminals 13 adjacent to each other. With this configuration, a busbar module 20G and a battery pack 1G have the same effect as that of the embodiment.

Reference Example

Although the busbar module 20 or the like includes a plurality of busbars 40 or the like in the description above, the busbar module 20 or the like may only include a single busbar 40 or the like.

The busbar module according to the embodiments includes a busbar having connection portions protruding toward electrode terminals relative to a base portion located between the connection portions. This configuration allows the connection portions of the busbar to be easily and directly joined to the electrode terminals.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A busbar module for electrically connecting a plurality of electrode terminals of an electrode terminal group in a battery module, the electrode terminals being linearly aligned, the busbar module comprising:
    a plurality of busbars, each of the busbars is configured to be connected to a respective pair of the electrode terminals that are adjacent to each other; and
    a flat cable including a linear conductor connected to one of the busbars, a cover that covers the linear conductor, and a busbar holder that holds the one of the busbars, wherein
    the plurality of busbars are aligned in a direction in which the electrode terminals are aligned,
    each of the busbars includes two connection portions configured to be connected to the respective pair of the electrode terminals, and a base portion located between the two connection portions,
    for each of the busbars, the two connection portions are disposed on opposite sides of the base portion with respect to the direction in which the plurality of busbars are aligned,
    at least one of the connection portions for each of the busbars protrudes toward the electrode terminals,
    the linear conductor is configured such that an end of the linear conductor is disposed between the two connection portions of the one of the busbars and is connected to the base portion of the one of the busbars, and
    the busbar holder is located between the one of the busbars and the linear conductor, wherein
    the two connection portions of the one of the busbars are held by the busbar holder through the base portion of the one of the busbars,
    for each of the busbars, each of the connection portions shares a boundary with the base portion, the boundary extending in an alignment crossing direction that crosses the direction in which the busbars are aligned, and
    for each of the busbars, the connection portions have a shape in which both edges of each of the busbars in the alignment direction of the busbars are bent toward the electrode terminals with the boundary is used as a bending origin.

2. The busbar module according to claim 1, wherein
    the base portion of the one of the busbars includes a busbar terminal that is a raised portion on an upper face of the base portion, and
    the linear conductor is configured such that the end of the linear conductor is connected to the busbar terminal.

3. A battery pack comprising:
    a battery module composed of a plurality of battery cells, each of the battery cells includes a plurality of electrode terminals, and the electrode terminals being linearly aligned; and a busbar module that electrically connects the battery cells, wherein
the busbar module includes
a plurality of busbars, each of the busbars is connected to a respective pair of the electrode terminals that are adjacent to each other, and
a flat cable including a linear conductor connected to one of the busbars, a cover that covers the linear conductor, and a busbar holder that holds the one of the busbars,
the plurality of busbars are aligned in a direction in which the electrode terminals are aligned,
each of the busbars includes two connection portions connected to the respective pair of the electrode terminals, and a base portion located between the two connection portions,
for each of the busbars, the two connection portions are disposed on opposite sides of the base portion with respect to the direction in which the plurality of busbars are aligned,
at least one of the connection portions for each of the busbars protrudes toward the electrode terminals,
the linear conductor is configured such that an end of the linear conductor is disposed between the two connection portions of the one of the busbars and is connected to the base portion of the one of the busbars, and
the busbar holder is spaced away from each of the electrode terminals, wherein
the two connection portions of the one of the busbars are held by the busbar holder through the base portion of the one of the busbars,
for each of the busbars, each of the connection portions shares a boundary with the base portion, the boundary extending in an alignment crossing direction that crosses the direction in which the busbars are aligned, and
for each of the busbars, the connection portions have a shape in which both edges of each of the busbars in the alignment direction of the busbars are bent toward the electrode terminals with the boundary is used as a bending origin.

* * * * *